Dec. 26, 1950  R. G. HOCH  2,535,133
LIMIT CONTROL APPARATUS
Filed Aug. 28, 1947
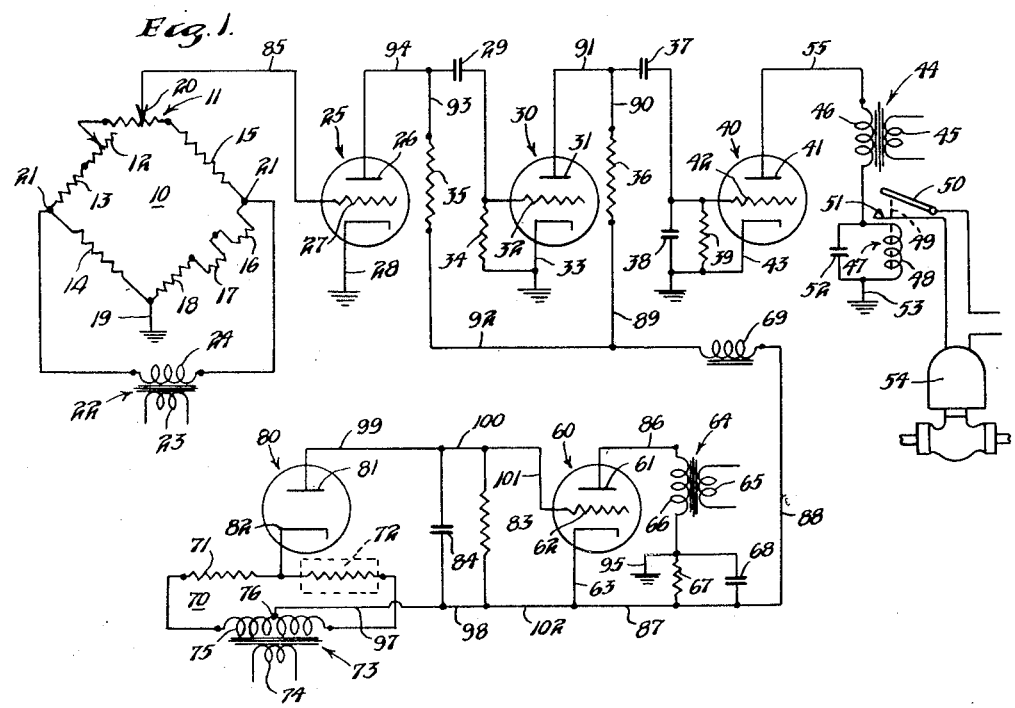
Inventor
ROBERT G. HOCH
George H. Fisher
Attorney Patented Dec. 26, 1950

2,535,133

UNITED STATES PATENT OFFICE 2,535,133

LIMIT CONTROL APPARATUS

Robert G. Hoch, Minneapolis, Minn., assignor to Minneapolis-Honeywell Regulator Company, Minneapolis, Minn., a corporation of Delaware Application August 28, 1947, Serial No. 771,116

8 Claims. (Cl. 177—311)

The present invention is concerned with limit control apparatus and more particularly with limit control apparatus wherein a condition must be maintained within a predetermined range, and when the condition deviates from that range, a control function takes place to render inoperative an indicating device or a control apparatus.

In the condition control art, it is frequently necessary to provide means for rendering a control apparatus inoperative regardless of the direction in which the condition deviates from normal. It is further desired, in some applications to provide indicating means for indicating when a condition deviates from normal and to provide further indicating means when the sensing means is inoperative.

Such a function is accomplished in the present invention by providing an electrical network which is normally balanced when a desired operating condition exists. When the operating condition deviates from normal there will be an unbalance in the network which is operable to accomplish a desired limiting or indicating function regardless of the direction of unbalance.

It is therefore an object of the present invention to provide an improved limit control apparatus which will render inoperative a control apparatus when a condition deviates from normal regardless of the direction of the deviation.

A further object of the present invention is to provide a limit control apparatus which will render inoperative a control apparatus when the condition sensing means of the limit apparatus is open circuited or short circuited.

A still further object of the present invention is to employ a normally balanced electrical bridge network operating in conjunction with an electron discharge device to perform a biasing function in a main control apparatus when a condition sensed deviates from normal.

Still another object of the present invention is to provide an electronic unbalance sensing means which is normally inoperative when the condition sensed is normal and is operable to bias a further electronic means to be inoperative when the condition sensed is abnormal or the sensing device is inoperative.

Other objects of the present invention will be apparent from the accompanying specification, claims, and the drawing, of which Figure 1 shows the present invention applied to a cabin temperature control apparatus; and Figure 2 shows the present invention applied to a fire detection apparatus.

Referring to Figure 1, the reference numeral 10 represents the control bridge of an aircraft cabin temperature control apparatus. The bridge 10 is made up of a calibrating potentiometer 11, a temperature selector 12, a cabin temperature responsive resistor 13, bridge resistors 14 and 15, outdoor air temperature compensating resistor 16, a discharge air compensating resistor 17, and a further bridge resistor 18. The resistors 13, 16, and 17 are all temperature responsive resistors having high temperature coefficients of resistance. The output of the bridge 10 is taken from a ground terminal 19 and a potentiometer wiper 20; the input for the bridge 10 is by way of a pair of terminals labeled 21. Energization for the bridge is furnished by means of transformer 22 which consists of a primary 23, connected to a power source not shown, and a secondary 24 which is connected directly to the input terminals of the bridge 10.

An amplifying stage 25 is provided to amplify the output from the bridge network 10 and consists of an anode 26, a control element 27, and a grounded cathode 28. A coupling condenser 29 serves to connect the amplifying tube 25 to a further amplifier 30. The amplifier 30 consists of an anode 31, control element 32, and a grounded cathode 33. Grid resistor 34 serves to connect the control element 32 to the grounded cathode 33. Resistors 35 and 36 act as plate resistors for the amplifiers 25 and 30 respectively. A coupling condenser 37 serves to connect the amplifying stage 30 to the output stage 40. The output stage 40 consists of an anode 41, a control element 42, and a grounded cathode 43. The control element 42 and cathode 43 are directly connected by a filter condenser 38 and a grid resistor 39. The energizing voltage for the output stage 40 comes from a transformer 44 having a primary winding 45, connected to a power source not shown, and a secondary winding 46.

A control relay 47 is also in the output circuit of the output stage 40 and consists of a relay winding 48, an armature 49, a switch arm 50, normally biased open by means not shown, and a switch contact 51. A bypass condenser 52 is connected across the relay winding 48 to function in the usual manner to bypass the alternating component of current flowing in the output circuit of amplifier 40. Energized by the closing of switch contact 51 and blade 50 is an electromagnetic flow valve of any desired type.

The energizing voltage for the amplifying stages 25 and 30 comes from the rectifying stage 60 which consists of an anode 61, a control element 62, and a cathode 63. The power source for the rectifier 60 comes from a transformer 64 having a primary winding 65 connected to a power source not shown, and a secondary winding 66. The output for the rectifier 60 consists of a load resistor 67, a filter condenser 68 and a filter choke coil 69.

A pilot flame sensing bridge 70 consists of the resistor 71, a temperature sensitive resistor 72 having a high temperature coefficient of resistance which may be positive or negative, a transformer 73 having a primary winding 74, connected to a power source not shown, and a secondary winding 75 with a centertap 76. The resistors 71 and 72 are joined to a conductor 96 while their opposite ends are connected to the ends of secondary 75. The output terminals of the bridge are at conductor 96 and center tap 76. In the output of the bridge 70 is a diode 80 consisting of an anode 81 and a cathode 82. Connected in circuit with the diode 80 is a filter condenser 84 and a biasing resistor 83.

Operation of Figure 1

The operation of the apparatus shown can best be understood by understanding the operation of a typical aircraft cabin temperature control apparatus. Normally, a gas heater is provided in the aircraft to keep the cabin at a comfortable temperature. To keep the temperature substantially constant, it is necessary to provide a sensing bridge which will sense not only the temperature within the cabin but also the outside temperature to anticipate better the amount of heat required to keep the temperature constant. Also, the temperature of the discharge air from the gas heater must be sensed to better maintain the temperature constant within the aircraft cabin.

Normally, when the temperature condition is satisfied in the cabin, there will be no output across the output terminals of the temperature sensing bridge 10. Since the output terminals of the bridge 19 and 20 are connected to the amplifying stage 25 through ground and conductor 85 respectively, it can be seen that the amplifying stage 25 will not have any alternating current on its input when the bridge 10 is balanced. With no input to amplifier 25 there will be no alternating current output from the amplifier 25 and therefore there will be no input to amplifier 30 as any direct current flowing in the output stage of amplifier 25 will not effect the grid 32 of amplifier 30 since there is a blocking condenser 29 in the coupling from the anode 26 to the grid 32. With no input signal on the control grid 32 of the amplifier 30 there will be no alternating current flow in the output circuit and the direct current flowing in the output circuit will not effect the input control grid 42 of amplifier 40 since there is a blocking condenser 37 in the coupling between the anode 31 and the control grid 42. The anode supply voltage for amplifiers 25 and 30 will, at this point in the explanation, be presumed to be of a conventional type of direct current supply supplying the desired operating potentials and which will cause direct current to flow in the anode circuits whether there is alternating signal voltage on the control elements of the amplifier or not. The anode supply voltage for the amplifier 40 may be traced from the upper terminal of secondary winding 46 through conductor 55, anode 41, grounded cathode 43, ground 53, and relay winding 48 back to the lower terminal of the secondary winding 46. When there is no input to the amplifier control element 42, it can be seen that since the control element is effectively tied to the cathode by way of the grid resistor 39, there will be a certain amount of alternating current flow in the amplifier just traced. This current flow, however, will not be sufficient to cause the energization of the relay 47.

As soon as there is an unbalance in the temperature sensing bridge 10, due to the various temperature sensing elements present in the bridge as where the temperature in the cabin drops and causes a decrease in the resistance of resistor 13, there will be an output signal across the output terminals 19 and 20 which will be assumed to have a phase such as to call for an increase in the amount of heat to be supplied to the cabin. Since the output of this bridge will be an alternating current, it will be amplified by the amplifiers 25 and 30 and fed into the control element 42 of the output stage 40. Since the output stage 40 is energized by an alternating current power source, it can be seen that the stage will be conductive only during the positive half cycle of the power supply. Therefore, to render the tube conducting sufficiently to energize relay 47, it is necessary to have a signal calling for a temperature increase to be phased so that the input to the stage 40 will be positive when the tube is on the conducting half cycle. Should the input signal to the output stage 40 be of the opposite phase, as would occur when the temperature condition at the bridge 10 is more than satisfied, the stage would not be conductive sufficiently to cause energization of the relay 47. When the relay 47 is energized, as when there is a temperature drop in the cabin of the plane, the switch arm 50 will move into engagement with contact 51 to complete an electrical circuit to some energizing means such as the electromagnetic valve 54 which makes it possible to put the gas heater into operation.

The functioning of the discharge air compensating resistor 17 is to prevent the overshooting of the temperature of the cabin when there is a call for heat by the cabin temperature responsive resistor 13. The outdoor temperature compensating resistor 16 functions to anticipate the need for added heat or less heat as the plane flies through air masses having different temperatures. Both resistors 16 and 17, while not having as great a controlling effect as resistor 13, do function to anticipate the demand for heat in the cabin of the plane and help to stabilize the temperature of the cabin. Temperature responsive resistors 13, 16, and 17 all have the same effect in that a drop in the temperature condition to which any one is responsive causes a change in the balance of the bridge in a direction to cause energization of relay 47. Temperature selector 12 is a manual adjustment of the balance point of the bridge 10 and actually functions as the selector for the temperature desired within the cabin.

As mentioned above, the rectifier 60 serves to provide operating voltages for the amplifiers 25 and 30. Normally, the rectifier 60 acts merely as a diode in a conventional power source. The energizing voltage for the rectifier 60 comes from the transformer secondary 66. This circuit may be traced from the upper terminal of the transformer 66 through conductor 86, anode 61, cathode 63, conductor 87, and resistor 67 back to the lower terminal of the secondary winding 66. Since the current flow through the rectifier will be in only one direction there will be a charge built up on the condenser 68 so that the lower terminal is positive and the upper terminal is negative. The rectifier voltage from the condenser 68 effectively supplies the direct current voltage for the amplifying stages 25 and 30. Thus, a circuit may be traced from the lower terminal of the condenser 68 through conductor 88, choke 69, conductor 89, resistor 36, conductors 90 and 91, anode 31, grounded cathode 33, and ground 95 back to the upper terminal of the condenser 68. A similar circuit can be traced for amplifier 25 from the lower terminal of condenser 68, through conductor 88, choke 69, conductor 92, resistor 35, conductors 93 and 94, anode 26, grounded cathode 28, and ground connection 95 back to the upper terminal of the condenser 68.

As yet, no consideration has been given to the use of the control element 62 of the rectifier 60. It can be seen that there is a connection between the control element 62 and the cathode 63 by means of a resistor 83 and, therefore, without a further current flow through the resistor 83 the control element will have little effect upon the current flow through the rectifier 60. As noted above, the resistor 83 is also in the plate circuit of the diode 80 and so under certain conditions, to be explained hereinafter, it will be possible to have a further current flow through the resistor 83 to bias the rectifier 60.

Since there is a gas heater in use of the control system, there is provided therewith a pilot flame to always insure that there will be an igniting means when the heater is put into operation. This is where the pilot flame sensing bridge 70 comes into operation. The resistance element 72 is normally located within the gas pilot flame and since it is a thermo-resistor, it will assume a resistance according to the temperature of the gas pilot flame. The size of the resistor 71 is so chosen that it will equal the resistance of the temperature responsive resistor when the latter is surrounded by the pilot flame. Under such conditions, when there is a pilot flame across the resistor 72, the bridge will be balanced and there will be no output between the centertap 76 and the conductor 96.

Upon a failure of the pilot flame, the resistance 72 will decrease in resistance sufficiently to unbalance the bridge so that there will be an alternating current across the output terminals of the bridge which are the conductor 96 and the centertap 76. This output voltage will then be detected by the diode 80 and its associated circuit. When there is an unbalance, it is possible to trace a circuit through the diode 80 from conductor 96 through conductor 99, conductor 100, resistor 83, conductor 98, and conductor 97 to the opposite output terminal of the bridge 76. Since the output of the bridge will be alternating current, it can be seen that the diode 80 will rectify that output voltage and there will be a voltage built up upon the condenser 84 so that the upper terminal is negative and the lower terminal is positive. Since the upper terminal of condenser 84 is effectively connected to the control element of rectifier 60 by way of conductors 100 and 101 and to the cathode 63 by way of the conductors 98 and 102, the rectifier 60 will be biased effectively below the conducting point and there will be no output from the rectifier. This will mean that the charge built up on the condenser 68 of the rectifier output will not be maintained and therefore there will be no more plate supply for the amplifiers 25 and 30 of the main control network. With the lack of plate voltage on the amplifiers 25 and 30, it will be impossible to have the signal from the temperature sensing bridge 10 reach the output amplifier 40 to cause any energization of the relay 47. Were it possible to energize the relay 47 without a pilot flame present in the heater, it would be possible to have gasoline injected into the heater which would result in an obviously dangerous condition.

As soon as the pilot flame is reestablished, the resistor 72 will again assume the normal value which is operable to maintain the network 70 balanced, and there will be no output from the output terminals of the bridge. With no output from the bridge, there will be no current flow through the rectifier 80 and no biasing voltage built on the condenser 84 to bias the rectifier 60. With the rectifier 60 operating in its normal manner, the regular temperature control apparatus will be operative in its normal manner.

Should the resistor 72 become short circuited for any reason, the result will be the same as when the pilot flame was not present. The bridge 70 will be unbalanced in the same direction and the rectifier 80 will serve to bias rectifier 60 to be non-conducting. With rectifier 60 inoperative, the amplifiers 25 and 30 will not pass any heat demanding signal to the output control tube 40.

If there should be a break in the temperature responsive resistor 72, it can be seen that there will be a signal in the output of the bridge as when the bridge is unbalanced when there is no pilot flame present. This unbalance, due to a break in the temperature responsive resistor 72, will result in a bridge unbalance in the opposite phase sense as when the pilot flame was extinguished or the resistor 72 was shorted. However, since there is a rectifier in this output circuit which is in no way phase sensitive, this output signal will be rectified as was the case before and there will be a biasing voltage built up on the condenser 84 which will again bias the rectifier 60 below cutoff and thereby render the amplifiers 25 and 30 inoperative.

*Figure 2*

Referring now to Figure 2, there is shown the present invention applied to a fire detection apparatus. The reference numeral 110 represents a fire detection bridge which consists of a main transformer 111 having a primary 112 connected to a power source not shown, and a secondary 113 having a center tap 114. The bridge 110 further consists of a bridge resistor 115 and a temperature responsive resistor 116 which has a high temperature coefficient of resistance which may be negative or positive. A reference numeral 120 represents an unbalance sensing diode having an anode 121 and a cathode 122. A control amplifier 125 consists of an anode 126, a control element 127, and a grounded cathode 128. Supplying energy for amplifier 125 is a transformer 129 having a primary 130 connected to a power source not shown, and a secondary winding 131. Located in the energizing circuit for the amplifier 125 is a relay 132. This relay consists of a relay winding 133, an armature 134, a switch arm 135 normally biased to open position by means not shown, and a switch contact 136. A bypass condenser 137 is connected across the winding 133 to function in the usual manner. A further control stage is represented by the numeral 140 which consists of an anode 141, a control element 142, and a grounded cathode 143. The energizing voltage for the amplifier 140 is derived from a transformer 146 having a primary 147, connected to a power source not shown, and a secondary winding 148. Also in the energizing circuit for the control stage 140 is a relay 149 which consists of a relay winding 150, an armature 151, a switch arm 152, biased to closed position by means not shown, and a switch contact 153. Connected across the relay winding 150 is a bypass condenser 154. Indicating lamps 155 and 156 are provided to indicate proper functioning of the apparatus. A battery 157 is provided for energizing the indicating lamps 155 and 156.

Operation of Figure 2

In the application of the present invention shown in Figure 2, it is desirable to sense the presence of a flame when it is not normally desired. This will mean that the sensing bridge 110 will be balanced when there is no flame or fire intersecting the resistor 116. The size of the resistor 115 is so chosen that it will be equal to the resistance of the resistor 116 when there is no flame present across the latter. Under these conditions, there will not be any output across the sensing bridge 10 of terminals 161 and 160. When the apparatus is operating normally, that is when there is no flame present, the control tubes 125 and 140 are both conducting sufficiently to energize their respective plate relays 132 and 149. The energizing circuit for the relay 132 may be traced from the upper terminal of the secondary winding 131 through conductor 162, anode 126, grounded cathode 128, ground 163, relay winding 133, and conductor 164 back to the lower terminal of the secondary winding 131. When the relay 132 is energized, the switch arm 135 will move into engagement with switch contact 136. When the switch arm 135 engages contact 136, a circuit will be completed to the indicating lamp 156 from the battery 157. This circuit may be traced from the positive terminal of the power supply 157 through conductor 165, contact 136, switch arm 135, conductor 166, conductor 167, indicating lamp 156, ground 168, and ground 169 back to the negative terminal of the power supply 157.

The energizing circuit for the stage 140 may be traced from the upper terminal of the secondary winding 148 through conductor 170, anode 141, cathode 143, conductor 171, ground 177, ground 172, relay winding 150, and conductor 173 back to the lower terminal of secondary winding 148. As mentioned above, when there is no fire present, the stage 140 will be normally conducting sufficiently to energize the relay 149. This will mean that the switch arm 152 will move out of engagement with contact 153 so that it will be impossible to complete an electrical circuit through the switch arm and contact.

Therefore, under normal conditions, the indicating lamp 156 will be energized to indicate that the apparatus is functioning properly. As soon as a flame intersects the resistor 116, the bridge 110 will become unbalanced. Since the bridge 110 is energized by alternating current, the unbalance signal from the bridge will be an alternating current signal. This unbalance signal will be detected by the diode 120 to effectively bias the control tubes 125 and 140. An unbalance sensing circuit is formed by the diode 120 acting with the resistor 144 and condenser 145. The unbalance signal will be rectified by the diode and will place a charge upon the condenser 145. This entire unbalance sensing circuit may be traced from the bridge output terminal 161 through diode 120, conductor 175, conductor 176, resistor 144, ground 177, back to ground terminal 160 which is the other output terminal of the bridge 110. The rectified signal from the diode 120 will place a charge upon the condenser 145 such that the upper terminal will be negative and the lower terminal will be positive. This bias voltage, when there is a fire intersecting the resistor 116, will be sufficient to bias the control stage 140 below cutoff so that the relay 149 located in the plate circuit of the stage 140 will be deenergized and the switch arm 152 will move into engagement with contact 153. When this occurs, there will be a circuit established to the indicating lamp 155 from the battery 157. This circuit may be traced from the positive terminal of the battery 157 through conductor 165, contact 136, switch arm 135, conductor 166, conductor 178, contact 153, switch arm 152, conductor 179, lamp 155, ground 180, and ground 169, back to the negative terminal of the battery 157. The biasing voltage across the condenser 145 is also applied to the control element 127 of the control stage 125 by way of conductor 181 and conductor 175. The control stage 125 and the relay 132 are so selected, however, as to remain operative when the stage 140 is rendered inoperative by the bias across the condenser 145 due to a flame across resistor 116. From this it can be seen that the switch arm 135 will remain in engagement with contact 136 to keep the above traced electrical circuit for the indicating lamps 155 and 156 complete.

From the above, it can be seen, that when a flame intersects the resistance 116 there will be sufficient unbalance across the output terminals of the bridge to cause deenergization of the relay 149 which will cause the energization of the indicating lamp 155. With the lamp 156 energized, the operator will be aware that the system is operating properly. When the lamp 156 and the lamp 155 are both energized, the operator will be aware of the fact that the system is operating properly and that there is a fire present across the resistor 116. Further consideration must be given to the present apparatus when there is an open circuit in the resistor 116. When this occurs, there will be the maximum amount of unbalance in the bridge network 110 and when detected by the diode 120 will put a very large bias signal on the condenser 145. This biasing voltage, when resistor 116 is open, will be sufficient to bias the control stage 125 below cutoff and the relay 132 will also be deenergized. When this occurs, the switch arm 135 will move out of engagement with contact 136 and the circuit that was originally traced to the indicating lamps 155 and 156 will be broken. With both the lamps 155 and 156 deenergized, the operator will be aware of the fact that the apparatus will not function properly due to an open circuit in the sensing resistor 116.

A short circuit condition across the resistor 116 will result in a maximum of unbalance in the bridge 110 which will have a phase opposite to the unbalance present when resistor 116 open circuited. This unbalance, however, will still be detected by the rectifier 120 in the same manner as before and as in the case of the open circuit, both lamps 155 and 156 will be deenergized.

The present invention, therefore, provides means for sensing an unbalanced condition at a bridge network to perform a limiting function in a control apparatus. It further provides a limiting action regardless of the direction of unbalance of the bridge network. Furthermore, the invention provides electronic detecting means to render inoperative a controllable rectifying impedance in accordance with the deviation in a condition from a desired value. Furthermore, while I have shown a specific form of my invention as applied to a cabin temperature control apparatus and a fire detecting apparatus, it will be understood that this is for illustrative purposes only and that the invention is to be limited solely by the scope of the appended claims.

I claim:

1. In a limit control apparatus, a first impedance means, condition sensing means, a power transformer including a tapped secondary winding, means connecting said first impedance means and said condition sensing means in a series connection to the ends of said secondary to comprise a bridge network with output terminals at said tap and the point of connection of said impedance and condition sensing means, an electron discharge device having an anode and cathode, a second impedance means, means connecting said anode to one end of said second impedance, means connecting said tap to the other end of said second impedance, said discharge device and said impedance comprising an unbalance detecting means, a further electron discharge device comprising an anode, cathode and control element, means connecting said last named cathode to the tap on said secondary, and means connecting said control element to said second impedance where said impedance is connected to the anode of said first device so that when said bridge network is unbalanced in either direction and said first device is conductive there will be a current flowing through said second impedance to impress upon said control element a signal to maintain said second device nonconductive.

2. In a limit control apparatus a first impedance means, a flame sensitive impedance, a power transformer including a tapped secondary winding, means connecting said first and said flame sensitive impedance in a series circuit to the end terminals of said secondary to comprise with said secondary a normally balanced bridge network with output terminals at the tap on said secondary and the point of connection of said impedances, a rectifier, a second impedance, means directly connecting said second impedance and said rectifier in a series circuit to the output terminals of said network, said rectifier when said bridge becomes unbalanced in either direction causing a current flow through said second impedance so that there will be a voltage drop thereacross of a predetermined polarity with one end positive and the other negative, a normally conducting main control tube comprising an anode, cathode and control element, and means connecting said control element of said tube to said second impedance at the end which is negative so that when said rectifier is operative and conducting due to an unbalance of said bridge said tube will be rendered nonconductive.

3. In a limit control apparatus, a normally balanced electrical bridge having a pair of output terminals therein, a temperature sensitive impedance connected in one arm of said bridge, a rectifier, a second impedance, means directly connecting said rectifier in series with said second impedance to the output terminals of said bridge so that when said bridge becomes unbalanced in either direction a unidirectional current will flow in said series connection and there will be a voltage drop across said second impedance with one end thereof positive and the other end negative, a normally conducting electron discharge device having an anode, cathode and control element, means connecting said cathode and control element to said second impedance with the control element at the negative end when said voltage drop is present so that upon said rectifier becoming conductive the voltage drop on said second impedance will cause said tube to be rendered nonconductive.

4. Control apparatus, comprising, electrical means to be controlled, an electron discharge device having a control electrode, a source of power connected in circuit with said device, an impedance connected at one end to said control electrode so that normally said control electrode will assume a potential at which said discharge device will be conductive, means connecting said discharge device to maintain said electrical means operative while said device is conductive, condition responsive means having electrical circuit means connected thereto, said responsive means having output terminals with a voltage thereon only when the condition responded to lies outside of predetermined limits, and means connecting said terminals to said impedance to apply a voltage thereto with the end thereof connected to said control electrode being negative when said terminals have a voltage thereon, said discharge device being rendered nonconductive when said control electrode is negative to render inoperative said electrical means.

5. Control apparatus, comprising, an electronic amplifier, an electron discharge device having a control electrode, a source of power connected in circuit with said device, an impedance connected at one end to said control electrode so that normally said control electrode will assume a potential at which said discharge device will be conductive, said discharge device when conducting supplying a unidirectional operating voltage to said amplifier, condition responsive means having electrical circuit means connected thereto, said responsive means having output terminals with a voltage thereon only when the condition responded to lies outside of predetermined limits, and means connecting said terminals to said impedance to apply a voltage thereto with the end thereof connected to said control electrode being negative when said terminals have a voltage thereon, said discharge device being rendered nonconductive when said control electrode is negative to render ineffective the supply of operating voltage to said amplifier.

6. Control apparatus, comprising, an electrical indicating means for indicating when a sensed condition lies outside of predetermined limits, an electron discharge device having a control electrode, a source of power connected in circuit with said device, an impedance connected at one end to said control electrode so that normally said control electrode will assume a potential at which said discharge device will be conductive, means connecting said discharge device to said indicating means to maintain said indicating means operative in a first sense while said device is conductive, condition responsive means having electrical circuit means connected thereto, said responsive means having output terminals with a voltage thereon only when the condition responded to lies outside of predetermined limits, and means connecting said terminals to said impedance to apply a voltage thereto with the end thereof connected to said control electrode being negative when said terminals have a voltage thereon, said discharge device being rendered nonconductive when said control electrode is negative to render said indicating means operative in a second sense to indicate the condition sensed lies outside of said predetermined limits.

7. Flame sensing apparatus, comprising, electrical indicating means for indicating the presence or absence of a flame, an electron discharge device having a control electrode, a source of power connected in circuit with said device, an impedance connected at one end to said control electrode so that normally said control electrode will assume a potential at which said discharge device will be conductive, means connecting said discharge device to maintain said indicating means operative while said device is conductive, flame responsive means having a temperature responsive impedance in circuit therewith, said responsive means having output terminals which normally have no voltage thereon when the impedance of said responsive impedance is within predetermined limits and which do have a direct voltage thereon of a fixed polarity when the impedance of said responsive impedance lies outside of said predetermined limits, and means connecting said terminals to said first named impedance to apply a voltage thereto with the end thereof connected to said control electrode being negative when said terminals have a voltage thereon, said discharge device being rendered nonconductive when said control electrode is negative to render said indicating means operative to indicate a flame or at failure of said responsive impedance.

8. In condition controlling apparatus, condition responsive means, a condition controlling device, an electronic amplifier connecting said condition responsive means to said device and operable when energized to cause operation of said device under the control of said responsive means, means including a grid controlled rectifier connected to an alternating source of power to supply a unidirectional operating voltage to said amplifier, an electrical impedance adapted to be exposed to a limiting condition and having an impedance value which lies within predetermined limits, and means including said last named impedance connected to the grid of said rectifier to apply a negative voltage thereto to render said rectifier nonconductive when the impedance of said electrical impedance changes in either direction beyond said predetermined limits.

ROBERT G. HOCH.

REFERENCES CITED

The following references are of record in the file of this patent:

UNITED STATES PATENTS

| Number | Name | Date |
|---|---|---|
| 2,144,668 | Stoessel | Jan. 24, 1939 |
| 2,224,119 | Harrison | Dec. 3, 1940 |
| 2,383,806 | Kubler et al. | Aug. 28, 1945 |
| 2,385,976 | Evans et al. | Oct. 2, 1945 |
| 2,420,578 | Wilson | May 13, 1947 |